(12) United States Patent
Bassler et al.

(10) Patent No.: US 7,294,326 B2
(45) Date of Patent: Nov. 13, 2007

(54) HYDROCYANIC ACID CONSISTING OF FORMAMIDE

(75) Inventors: Peter Bassler, Viernheim (DE); Wolfgang Siegel, Limbugerhof (DE); Guenther Achhammer, Mannheim (DE); Anton Negele, Deidesheim (DE); Helmuth Menig, Friedelsheim (DE); Wilhelm Ruppel, Mannheim (DE); Peter Zehner, Ludwigshafen (DE); Hermann Luyken, Ludwigshafen (DE); Volker Vogt, Wachenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 158 days.

(21) Appl. No.: 10/537,820

(22) PCT Filed: Dec. 3, 2003

(86) PCT No.: PCT/EP03/13624

§ 371 (c)(1),
(2), (4) Date: Jun. 6, 2005

(87) PCT Pub. No.: WO2004/050587

PCT Pub. Date: Jun. 17, 2004

(65) Prior Publication Data

US 2006/0110309 A1    May 25, 2006

(30) Foreign Application Priority Data

Dec. 4, 2002 (DE) ................. 102 56 578

(51) Int. Cl.
*C01C 3/02* (2006.01)

(52) U.S. Cl. ........................................ 423/373
(58) Field of Classification Search ................. 423/373
See application file for complete search history.

(56) References Cited

U.S. PATENT DOCUMENTS

| 1,675,366 A | * | 7/1928 | Frone et al. ................. 423/373 |
| 2,042,451 A | * | 6/1936 | Bond et al. ................. 423/373 |
| 2,904,400 A | * | 9/1959 | Erich et al. ................. 423/373 |
| 4,693,877 A | * | 9/1987 | Oehsen et al. ............. 423/373 |
| 4,745,207 A | * | 5/1988 | Brunnmueller et al. ..... 558/351 |
| 4,869,889 A | * | 9/1989 | Sherwin et al. ............. 423/373 |
| 2002/0018744 A1 | * | 2/2002 | Mattmann et al. .......... 423/373 |

FOREIGN PATENT DOCUMENTS

| DE | 477 437 | 5/1929 |
| DE | 1 000 796 | 1/1957 |
| DE | 1 209 561 | 1/1966 |
| EP | 0 209 039 | 1/1987 |

* cited by examiner

*Primary Examiner*—Wayne A. Langel
(74) *Attorney, Agent, or Firm*—Oblon, Spivak, McClelland, Maier & Neustadt, P.C.

(57) ABSTRACT

The present invention relates to a process for preparing hydrocyanic acid (HCN) by catalytic dehydration of gaseous formamide in a reactor which has an internal reactor surface made of a steel comprising iron and chromium and nickel, and also to a reactor for preparing hydrocyanic acid by catalytic dehydration of gaseous formamide, which reactor has an internal reactor surface made of a steel comprising iron and chromium and nickel, and also to the use of the reactor of the present invention in a process for preparing hydrocyanic acid by catalytic dehydration of gaseous formamide.

21 Claims, No Drawings

HYDROCYANIC ACID CONSISTING OF FORMAMIDE

The present invention relates to a process for preparing hydrocyanic acid (HCN) by catalytic dehydration of gaseous formamide in the presence of atmospheric oxygen.

Hydrocyanic acid is an important basic chemical which is used as starting material in, for example, numerous organic syntheses such as the preparation of methacrylic esters and lactic acid, for preparing pharmaceutical and agrochemical products, in mining and in the metallurgical industry.

An important process for the industrial preparation of hydrocyanic acid is thermal dehydration of formamide under reduced pressure, which proceeds according to the equation (I).

$$HCONH_2 \rightarrow HCN + H_2O \quad (I)$$

This reaction is accompanied by the decomposition of formamide according to the equation (II) to form ammonia and carbon monoxide:

$$HCONH_2 \rightarrow NH_3 + CO \quad (II)$$

The ammonia formed catalyzes the polymerization of the desired hydrocyanic acid and thus leads to a deterioration in the quality of the hydrocyanic acid and a reduction in the yield of the desired hydrocyanic acid.

The polymerization of hydrocyanic acid and the soot formation associated therewith can be suppressed by addition of small amounts of oxygen in the form of air, as is disclosed, for example, in EP-A 0 209 039. EP-A 0 209 039 discloses a process for the thermolytic dissociation of formamide over highly sintered shaped bodies of aluminum oxide or aluminum oxide-silicon dioxide or over high-temperature corrosion-resistant shaped bodies of chromium-nickel stainless steel. In this process, the formamide conversion is incomplete and, furthermore, ammonia and carbon monoxide are formed as by-products in accordance with the equation (II). The residual formamide thus has to be separated off and recirculated, forming high-boiling by-products which have to be removed from the process. Furthermore, the added air leads to formation of carbon dioxide from the carbon monoxide formed according to equation (II) and this reacts with the ammonia which is simultaneously formed to give solid carbamates and thus leads to deposits which are difficult to handle and lead to corrosion in the plants employed (solids problems). The dissociation is generally carried out in stainless steel or iron tubes whose precise composition is not mentioned.

U.S. Pat. No. 2,042,451 relates to the dehydration of formamide for preparing HCN. As catalyst, use is made of a heated surface (brass or iron) which is coated with a thin catalytically active oxide layer of Zn, Al, Mg, Cr or Sn oxide. The reaction space is the intermediate space between a cylindrical metal tube and a cylindrical metal rod which has been inserted into the tube. According to the description it is important that no part of the gas is more than ½ inch away from the catalytic surface. The process achieves conversions of from 73 to 89%, based on formamide.

DE-A 1 209 561 relates to a process for preparing HCN by dissociation of formamide vapor over ferrioxide which has been deactivated by partial or complete binding of acids to form salts or by combination with one or more nonvolatile oxides of 1- to 6-valent metals as catalyst. The catalysts are generally present as pellets or as catalyst particles produced by ram extrusion. The dissociation is carried out in a dissociation furnace having tubes made of an Fe alloy comprising, for example, Fe together with 13% of Cr, 1% of Al, 1% of Si, <1% of Mr and about 0.1% of C.

De-A 1 000 796 relates to a process for the dissociation of formamide vapor, in which a temperature gradient within the dissociation furnace is taken into account by the dissociation being carried out over particulate or granular silicates or spinels which have been fired at a high temperature and comprise iron oxide in a dissociation space whose wall has a catalytic activity which is lower than that of the catalysts in the dissociation space. The wall consists of, for example, stainless steel comprising, in particular, about 84% of Fe and about 16% of Cr. The dissociation space is formed by externally heated tubes.

DE-A 477 437 relates to a process for the catalytic preparation of hydrocyanic acid from formamide, in which highly diluted formamide vapor is passed at high velocity in the absence of water-eliminating catalysts over metal catalysts such as ingot iron, V2A steel, nickel or aluminum at above 300° C. In one embodiment, the reaction is carried out in tubes which are made of catalytically active metal or lined with this and otherwise contain no catalyst.

It is an object of the present invention to provide a process for preparing hydrocyanic acid by catalytic dehydration of gaseous formamide in the presence of atmospheric oxygen, which displays a high selectivity to the desired hydrocyanic acid and in which the formation of ammonia according to equation (II) is suppressed as much as possible. High yields of hydrocyanic acid should be achieved in this way. At the same time, the process should be able to be operated at high pressure/load ratios and make it possible for dehydration to be carried out at pressures close to atmospheric pressure. Furthermore, a process in which the catalyst has a long operating life should be provided.

We have found that this object is achieved by a process for preparing hydrocyanic acid (HCN) by catalytic dehydration of gaseous formamide in the presence of atmospheric oxygen in a reactor which has an inner reactor surface made of a steel comprising iron and also chromium and nickel.

If a reactor having an inner reactor surface made of a steel comprising iron together with chromium and nickel is used, hydrocyanic acid can be obtained with good conversions and in high yields by catalytic dehydration of gaseous formamide with the aid of the process of the present invention. Additional internals and/or additional catalysts are not necessary in the process of the present invention.

The process of the present invention is thus preferably carried out using a reactor which contains no additional internals and/or catalysts, i.e. only the inner reactor surface is active as catalyst in the process of the present invention and no further catalysts are added.

It is in this way possible to provide an inexpensive reactor which has no internals. As a result, the pressure drop in the reactor is low, so that the process of the present invention can be carried out without a decrease in conversion at a relatively high reaction pressure, so that costs for complicated apparatuses for reducing the pressure can be saved. Furthermore, the reactor used in the process of the present invention, which contains no additional internals or catalysts, is mechanically stronger than a reactor with internals or catalysts since these are subject to increased corrosive attack during the course of the reaction. Furthermore, no complicated activation of the inner reactor surface by means of oxidation or reduction steps is necessary in the process of the present invention.

According to the present invention, it has been found that the chemistry of the steel from which the inner reactor surface is made up is critical for the catalytic dehydrogenation of gaseous formamide to form hydrocyanic acid.

The steel of which the inner reactor surface is made up preferably contains nickel and chromium in a ratio of from 1:1 to 1:2, particularly preferably from 1:1.5 to 1:2.

The proportion of iron in the steel forming the inner reactor surface is generally $\geq 50\%$ by weight, preferably $\geq 60\%$ by weight, particularly preferably $\geq 70\%$ by weight. The balance is generally nickel and chromium, with small amounts of further metals such as molybdenum, manganese, silicon, aluminum, titanium, tungsten, cobalt being able to be present in a proportion of generally from 0 to 5% by weight, preferably from 0 to 2% by weight.

Steel grades suitable for the inner reactor surface are, in general, steel grades corresponding to the standards 1.4541, 1.4571, 1.4573, 1.4580, 1.4401, 1.4404, 1.4435, 2.4816, 1.3401, 1.4876 and 1.4828. Preference is given to steel grades corresponding to the standards 1.4541, 1.4571, 1.4828, 1.3401, 1.4876, 1.4762, particularly preferably steel grades 1.4541, 1.4571, 1.4762, 1.4828.

The process of the present invention can be operated within a wide load range, particularly when the reactor contains no additional internals and/or catalysts, which is preferred. In general, the pressure/load ratio is from 1 to 100 kg of formamide/$m^2$ of reactor surface, preferably from 5 to 80 kg of formamide/$m^2$ of reactor surface, particularly preferably from 10 to 50 kg of formamide/$m^2$ of reactor surface. The operation at a high pressure/load ratio which is made possible by the process of the present invention makes it possible to use smaller reactors for a given product capacity than is possible in the prior art. This makes the process of the present invention particularly economical.

The process of the present invention for preparing hydrocyanic acid (HCN) gives the desired hydrocyanic acid in high selectivities of generally >90%, preferably $\geq 94\%$, and conversions of generally >90%, preferably a $\geq 95\%$, so that yields of generally >85%, preferably >90%, are achieved.

In the process of the present invention, gaseous formamide is generally reacted in the presence of atmospheric oxygen, preferably from 10 to 50 standard 1 of air/kg of formamide, particularly preferably from 20 to 30 standard 1 of air/kg of formamide. If too much atmospheric oxygen is added, a decrease in selectivity has to be expected.

The process of the present invention is generally carried out at reduced pressure, preferably at a pressure of from 70 to 350 mbar, particularly preferably from 200 to 250 mbar. Yields of >90% are achieved in the process of the present invention even at pressures of $\geq 200$ mbar. The process can thus be carried out inexpensively, since a lower vacuum has to be maintained during the dehydration reaction of the formamide.

The process of the present invention is generally carried out at from 350 to 650° C., preferably from 450 to 550° C., particularly preferably from 500 to 550° C. If lower or higher temperatures are selected, a deterioration in selectivity and conversion has to be expected.

The mean residence time over the reactor surface is generally from 0.01 to 0.25 s, preferably from 0.01 to 0.15 s.

In general, gaseous, superheated formamide is used in the process of the present invention. The formamide is preferably obtained by vaporizing liquid formamide in a heat exchanger, preferably a shell-and-tube heat exchanger, a falling film evaporator or a thin film evaporator under a reduced pressure of generally from 1 to 350 mbar, preferably from 100 to 250 mbar, and temperatures of generally from 100 to 300° C., preferably from 150 to 200° C.

Air is generally then introduced. The air can, if desired, be introduced in a preheated state.

In the actual dehydration, the formamide or the formamide/air mixture is, in an undiluted state, i.e. without addition of inert gases and/or ammonia, heated to the abovementioned temperatures and dissociated over the catalysts used in the process of the present invention to form hydrocyanic acid and water. Preferred residence times and pressures have been mentioned above.

A particular advantage of the process of the present invention is that the inner reactor wall used as catalyst in the process of the present invention is still highly selective even after long periods of operation and good conversions and thus good yields of the orders of magnitude mentioned above are achieved. In general, the operating lives of the catalysts are from 500 to 8000 hours, preferably from 1000 to 3000 hours. This makes the process of the present invention very economical, since frequent shutdown of the reactor for regeneration of the catalyst and an associated production downtime is avoided.

The present invention further provides a reactor for preparing hydrocyanic acid by catalytic dehydration of gaseous formamide, which has an inner reactor surface made of a steel comprising iron together with chromium and nickel. Preferred nickel/chromium ratios and proportions of iron and further components of the steel forming the inner reactor surface have been mentioned above.

This reactor makes it possible to carry out a catalytic dehydration of gaseous formamide for the preparation of hydrocyanic acid without additional catalysts having to be used or the reactor having additional internals.

The present invention further provides for the use of the reactor of the present invention in a process for preparing hydrocyanic acid by catalytic dehydration of gaseous formamide. The use of the reactor of the present invention in the process for preparing hydrocyanic acid enables hydrocyanic acid to be obtained from formamide with high selectivities and conversions and in good yields. Additional internals and/or catalysts in the reactor are not necessary.

The following examples illustrate the invention.

EXAMPLES

Example 1

A tube reactor (1.4541 (V2A steel), length: 400 mm, diameter: 6 mm) is heated to 520° C. and a gaseous formamide stream (FA) of 100 g/h is passed through it at a pressure of 230 mbar with addition of 24 standard 1 of air/kg of FA. This results in an HCN selectivity of 94% and an FA conversion of 95% over a period of 3000 hours.

Example 2

A tube reactor (1.4541, length: 400 mm, diameter: 6 mm) is heated to 520° C. and a gaseous formamide stream (FA) of 200 g/h is passed through it at a pressure of 450 mbar with addition of 24 standard 1 of air/kg of FA. This results in an HCN selectivity of 93.5% and an FA conversion of 81%.

Example 3

A tube reactor (1.4541, length: 400 mm, diameter: 6 mm) is heated to 520° C. and a gaseous formamide stream (FA) of 300 g/h is passed through it at a pressure of 600 mbar with addition of 24 standard 1 of air/kg of FA. This results in an HCN selectivity of 93.5% and an FA conversion of 70%.

Example 4

A tube reactor (1.4541, length: 400 mm, diameter: 6 mm) is heated to 520° C. and a gaseous formamide stream (FA) of 100 g/h is passed through it at a pressure of 230 mbar without addition of air. This results in an HCN selectivity of 96% and an FA conversion of intially 90%, which drops to 85% over a period of operation of 300 hours.

Example 5

A tube reactor (1.4541, length: 400 mm, diameter: 6 mm) is heated to 520° C. and a gaseous formamide stream (FA) of 100 g/h is passed through it at a pressure of 230 mbar with addition of 12.5 standard 1 of air/kg of FA. This results in an HCN selectivity of 95% and an FA conversion of initially 92%, which drops to 85% over a period of operation of 500 hours.

Example 6

A tube reactor (1.4541, length: 400 mm, diameter: 6 mm) is heated to 600° C. and a gaseous formamide stream (FA) of 100 g/h is passed through it at a pressure of 230 mbar with addition of 24 standard 1 of air/kg of FA. This results in an HCN selectivity of 90% and an FA conversion of 97%.

Example 7

A tube reactor (1.4541, length: 400 mm, diameter: 6 mm) is heated to 450° C. and a gaseous formamide stream (FA) of 100 g/h is passed through it at a pressure of 230 mbar with addition of 24 standard 1 of air/kg of FA. This results in an HCN selectivity of 90% and an FA conversion of 85%.

Example 8

A tube reactor (1.4541, length: 400 mm diameter: 6 mm) is heated to 520° C. and a gaseous formamide steam (FA) of 100 g/h is passed through it at a pressure of 230 mbar with addition of 24 standard 1 of air/kg of FA. This results in an HCN selectivity of 94% and an FA conversion of 95%.

Example 9

A tube reactor (1.3401, length: 400 mm, diameter: 6 mm) is heated to 520° C. and a gaseous formamide stream (FA) of 100 g/h is passed through it at a pressure of 230 mbar with addition of 24 standard 1 of air/kg of FA. This results in an HCN selectivity of 91% and an FA conversion of 94%.

Example 10

A tube reactor (1.4876, length: 400 mm, diameter: 6 mm) is heated to 520° C. and a gaseous formamide stream (FA) of 100 g/h is passed through it at a pressure of 230 mbar with addition of 24 standard 1 of air/kg of FA. This results in an HCN selectivity of 90% and an FA conversion of 90%.

Example 11

A tube reactor (1.4828, length: 400 mm, diameter: 6 mm) is heated to 520° C. and a gaseous formamide stream (FA) of 100 g/h is passed through it at a pressure of 230 mbar with addition of 24 standard 1 of air/kg of FA. This results in an HCN selectivity of 94% and an FA conversion of 91%.

Example 12

A reaction tube made of 1.4541 and having a length of 4.5 m, an internal diameter of 10 mm and an external diameter of 12 mm is heated electrically to a constant external temperature of 520° C. The reaction tube has a specific surface area of 400 $m^2/m^3$. The internal pressure in the tube is 200 mbar abs. and is produced by means of a vacuum pump.

In an upstream vaporizer, which is likewise under the reaction pressure, 1.3 kg/h of formamide are vaporized at 210° C. and fed to the top of the reaction tube. In addition, 13 standard 1 of air/h are fed in at the connection between the vaporizer and the reactor tube.

A sample is taken at the end of the reaction tube and analyzed to determine its constituents. The analysis indicated a formamide conversion of 98.52% and a hydrocyanic acid selectivity based on formamide of 93.21%.

Example 13

A reaction tube made of 1.4541 and having a length of 4.5 m, an internal diameter of 10 mm and an external diameter of 12 mm is heated electrically to a constant external temperature of 520° C. The reaction tube has a specific surface area of 400 $m^2/m^3$. The internal pressure in the tube is 200 mbar abs. and is produced by means of a vacuum pump.

In an upstream vaporizer, which is likewise under the reaction pressure, 2.2 kg/h of formamide are vaporized at 210° C. and fed to the top of the reaction tube. In addition, 18 standard 1 of air/h are fed in at the connection between the vaporizer and the reactor tube.

A sample is taken at the end of the reaction tube and analyzed to determine its constituents. The analysis indicated a formamide conversion of 97.12% and a hydrocyanic acid selectivity based on formamide of 94.74%.

Example 14

A reaction tube made of 1.4541 and having a length of 4.5 m, an internal diameter of 10 mm and an external diameter of 12 mm is heated electrically to a constant external temperature of 500° C. The reaction tube has a specific surface area of 400 $m^2/m^3$. The internal pressure in the tube is 200 mbar abs. and is produced by means of a vacuum pump.

In an upstream vaporizer, which is likewise under the reaction pressure, 2.4 kg/h of formamide are vaporized at 210° C. and fed to the top of the reaction tube. In addition, 18 standard 1 of air/h are fed in at the connection between the vaporizer and the reactor tube.

A sample is taken at the end of the reaction tube and analyzed to determine its constituents. The analysis indicated a formamide conversion of 94.00% and a hydrocyanic acid selectivity based on formamide of 93.85%.

Example 15

The preparation of hydrocyanic acid from formamide was repeated under the reaction conditions of Example 1 with the catalytically active reactor wall being lined with the various materials shown in Table 1.

| Material | Composition | FA[1] conversion | HCN selectivity | HCN yield |
|---|---|---|---|---|
| V2A steel (1.4541) | 74% Fe, 9% Ni, 17% Cr | 94% | 94% | 88.4% |
| Copper | 100% Cu | 4% | 62% | 2.5% |
| Nickel | 100% Ni | 53% | 40% | 21.2% |
| Aluminum | 100% Al | 45% | 97% | 43.7% |
| Alloy 601 (2.4851) | 60% Ni, 23% Cr, 14% Fe | 78% | 91% | 71% |
| Alloy 800 H (1.4876) | 30% Ni, 19% Cr, 51% Fe | 90% | 90% | 81% |
| HT steel (1.4828) | 11% Ni, 19% Cr, 70% Fe | 91% | 94% | 85.5% |
| HT steel (1.4841) | 19% Ni, 24% Cr, 57% Fe | 77% | 94% | 72.4% |
| Sicromal 12 (1.4762) | 26% Cr, 1.7% Al, 1.4% Si, 71% Fe | 65% | 93% | 60.5% |
| Chromium | 100% Cr | 88% | 83% | 73% |
| Alonized steel (1.4541) | Al surface, base: 1.4541 | 11% | 15% | 1.7% |
| Quartz |  | 14% | 31% | 4.3% |
| Iron | 100% Fe | 97% | 90% | 87.3% |
| V4A steel (1.4571) | 71% Fe, 10.5% Ni, 16.5% Cr, 2% Mo | 91% | 92.5% | 84.2% |

[1]FA = formamide

We claim:

1. A process for preparing hydrocyanic acid (HCN) comprising:
catalytically dehydrating gaseous formamide in the presence of atmospheric oxygen in a reactor comprising an inner reactor surface comprising a steel comprising iron and chromium and nickel;
wherein:
the process is carried out at a pressure of from 200 to 250 mbar; and
the reactor contains no additional internals, catalysts, or combinations thereof.

2. The process of claim 1, wherein the steel comprises nickel and chromium in a ratio of from 1:1 to 1:2.

3. The process of claim 1, wherein the inner reactor surface comprises a steel comprising >60% by weight of iron.

4. The process of claim 1, wherein the pressure/load ratio is from 1 to 100 kg of formamide/m$^2$ of reactor surface.

5. The process of claim 1, wherein the preparation of hydrocyanic acid is carried out in the presence of from 10 to 50 standard 1 of air/kg of formamide.

6. The process of claim 1 carried out at from 350 to 650° C.

7. The process of claim 1, wherein the reactor is a tube reactor comprising at least one tube.

8. The process of claim 1, wherein the process is carried out at a temperature of from 500 to 550° C.

9. The process as claimed in claim 2, wherein the inner reactor surface comprises a steel comprising ≧60% by weight of iron.

10. The process of claim 2, wherein the pressure/load ratio is from 1 to 100 kg of formamide/m$^2$ of reactor surface.

11. The process of claim 3, wherein the pressure/load ratio is from 1 to 100 kg of formamide/m$^2$ of reactor surface.

12. The process of claim 1, wherein the pressure/load ratio is from 5 to 80 kg of formamide/m$^2$ of reactor surface.

13. The process of claim 2, wherein the pressure/load ratio is from 5 to 80 kg of formamide/m$^2$ of reactor surface.

14. The process of claim 3, wherein the pressure/load ratio is from 5 to 80 kg of formamide/m$^2$ of reactor surface.

15. The process of claim 2, wherein the preparation of hydrocyanic acid is carried out in the presence of from 10 to 50 standard 1 of air/kg of formamide.

16. The process of claim 3, wherein the preparation of hydrocyanic acid is carried out in the presence of from 10 to 50 standard 1 of air/kg of formamide.

17. The process of claim 4, wherein the preparation of hydrocyanic acid is carried out in the presence of from 10 to 50 standard 1 of air/kg of formamide.

18. The process of claim 2 carried out at from 350 to 650° C.

19. The process of claim 3 carried out at from 350 to 650° C.

20. The process of claim 4 carried out at from 350 to 650° C.

21. The process of claim 1, wherein the gaseous formamide is free from added inert gases and ammonia.

* * * * *